United States Patent
Surnilla et al.

(10) Patent No.: US 8,165,788 B2
(45) Date of Patent: Apr. 24, 2012

(54) FUEL-BASED INJECTION CONTROL

(75) Inventors: Gopichandra Surnilla, West Bloomfield, MI (US); David Karl Bidner, Livonia, MI (US); Peter Charles Moilanen, Clinton, MI (US)

(73) Assignee: Ford Global Technlogies, LLC, Dearborn, MI (US)

( * ) Notice: Subject to any disclaimer, the term of this patent is extended or adjusted under 35 U.S.C. 154(b) by 420 days.

(21) Appl. No.: 12/470,652

(22) Filed: May 22, 2009

(65) Prior Publication Data

US 2010/0294236 A1    Nov. 25, 2010

(51) Int. Cl.
*B60T 7/12* (2006.01)
(52) U.S. Cl. ............... 701/113; 123/406.11; 123/406.47
(58) Field of Classification Search .................. 701/105, 701/113; 123/1 A, 285, 299, 406.11, 406.47, 123/575, 576
See application file for complete search history.

(56) References Cited

U.S. PATENT DOCUMENTS

| | | | |
|---|---|---|---|
| 6,044,642 A | 4/2000 | Nishimura et al. | |
| 6,557,532 B1 | 5/2003 | Nakayama et al. | |
| 6,725,829 B2 | 4/2004 | Kataoka et al. | |
| 7,051,701 B2 | 5/2006 | Tomita | |
| 7,171,953 B2 | 2/2007 | Altenschmidt | |
| 7,219,650 B2 | 5/2007 | Nagano et al. | |
| 7,287,509 B1 | 10/2007 | Brehob | |
| 7,370,629 B2 | 5/2008 | Kohler et al. | |
| 7,406,947 B2 * | 8/2008 | Lewis et al. | 123/478 |
| 7,475,683 B2 | 1/2009 | Kokubu | |
| 7,523,744 B2 | 4/2009 | Ayame | |
| 7,559,961 B2 * | 7/2009 | Jimeson et al. | 44/452 |
| 2007/0119425 A1 * | 5/2007 | Lewis et al. | 123/478 |
| 2009/0314260 A1 | 12/2009 | Maeda et al. | |
| 2010/0175657 A1 * | 7/2010 | Pursifull et al. | 123/179.16 |
| 2010/0179743 A1 * | 7/2010 | Surnilla et al. | 701/103 |
| 2011/0162620 A1 * | 7/2011 | Bidner et al. | 123/299 |

FOREIGN PATENT DOCUMENTS

WO    2008/015560    2/2008

OTHER PUBLICATIONS

Krengel, et al., "Fuel-based Injection Control" U.S. Appl. No. 12/885,208, filed Sep. 17, 2010, FGT103149, 37 Pgs.

* cited by examiner

*Primary Examiner* — John Kwon
(74) *Attorney, Agent, or Firm* — Allan J. Lippa; Alleman Hall McCoy Russell & Tuttle LLP

(57) ABSTRACT

Systems and methods of operating an engine, the engine including an injector configured to directly inject fuel into an engine cylinder. One example method comprises, during an engine cold start, performing compression direct fuel injection, and retarding a timing of the compression injection as a fuel alcohol content of the fuel increases.

20 Claims, 5 Drawing Sheets

FUEL-BASED INJECTION CONTROL

FIELD

The present application relates to methods and systems for controlling the injection timing of fuel in an internal combustion engine operating with fuel of varying composition.

BACKGROUND AND SUMMARY

Alternate fuels have been developed to mitigate the rising prices of conventional fuels and for reducing production of regulated emissions, such as $CO_2$. For example, alcohol and alcohol-based fuel blends have been recognized as attractive alternative fuels, in particular for automotive applications. Various engine systems may be used with alcohol fuels, utilizing various engine technologies such as turbo-chargers, super-chargers, etc. Further, various approaches may be used to control such alcohol-fuelled engines, including adjustment of boost or spark timing in dependence upon an alcohol content of the engine fuel, and various other engine operating conditions.

One example approach to control alcohol-fuelled engines is described by Brehob in U.S. Pat. No. 7,287,509. Herein, the injection timing of a directly injected alcohol fuel is adjusted to take advantage of the increased charge cooling effects of the alcohol fuel's higher heat of vaporization and increased octane. Specifically, the injection timing of one or more direct injections is advanced with increased alcohol in the fuel to take advantage of the higher latent enthalpy of vaporization of alcohol and to allow more time for vaporization. By advancing the injection timing, the intake system is cooled to enable the charge density that can be rammed into the combustion chamber to be increased. Overall, the charge cooling effect of the alcohol fuel is used to improve the peak torque output of the engine.

However, the inventors herein have recognized potential issues with such an approach. In one example, during an engine cold-start, when the temperature conditions of the engine are already not hot enough for an efficient combustion, advancing the injection timing responsive to an increase in fuel alcohol content may further cool the system and significantly reduce the efficiency of fuel evaporation and the formation of a homogeneous air-fuel mixture. The larger amount of time required to evaporate the fuel may degrade engine startability. Additionally, the charge cooling effect of the alcohol fuel on the intake system may further lower the air-charge temperature at cold-start conditions thereby further degrading combustion stability and increasing potential for engine misfire. As such, this may lead to reduced fuel economy and degraded cold-start exhaust emissions.

Thus in one example, some of the above issues may be addressed by a method of operating an engine, the engine including an injector configured to directly inject fuel into an engine cylinder. One example method comprises, during an engine cold start, performing compression direct fuel injection, and retarding a timing of the compression injection as a fuel alcohol content of the fuel increases.

In one example, the engine may be a flex-fuel engine of a vehicle configured with direct fuel injection. During an engine cold-start, when operating the engine with an alcohol-blended fuel, such as during a first number of combustion events from the start of engine rotation, a compression direct fuel injection may be performed. Further, the timing of the compression injection may be retarded as a fuel alcohol content of the injected fuel increases. In one specific example, during a first cold start of the engine, compression injection may be used for the first fuelled cylinder from the engine start, with the compression injection timing being a first timing where the fuel has a first alcohol content. During a second cold start of the engine, for example on a second day when the fuel blend in the fuel tank is different, compression injection may be used for the first fuelled cylinder from the engine start, with the compression injection timing being a second timing (more retarded from the first timing) where the fuel has a second alcohol content (higher than the first alcohol content, e.g., the second fuel has a greater alcohol amount by weight than the first fuel).

In one example, when operating with a fuel-blend with a lower percentage of alcohol (such as E10, which has 10% ethanol and 90% gasoline), the compression injection timing may be less retarded (that is, the injection timing may be less close to TDC of the compression stroke than to BDC). In another example, when operating with a fuel-blend with a higher percentage of alcohol (such as E85, which has 85% ethanol and 15% gasoline), the compression injection timing may be more retarded (that is, the timing may be moved closer to the TDC of the compression stroke). Additionally, to improve the atomization of the alcohol-based fuel, the fuel rail pressure may be raised with increasing alcohol content of the fuel. Further, to reduce potential over-pressure related issues, multiple compression fuel injections may be performed, the number of injections increased with the increasing alcohol content of the fuel.

By performing compression direct fuel injection, a higher air-charge temperature and higher valve temperature of the engine cylinders during the compression stroke may be advantageously used to more effectively evaporate the directly injected alcohol fuel. Since alcohol is a relatively low volatility fuel, by retarding the compression injection timing as the fuel alcohol content increases, the alcohol may be exposed to higher air-charge temperatures, thereby better enabling efficient evaporation and formation of a homogenous air-fuel mixture. In this way, the startability of alcohol-fuelled engines may be improved. Additionally, by evaporating most of the injected fuel, less fuel may be lost during engine operation, and the need for larger or pilot fuel injections at engine cold-start may be reduced. As such, this may provide fuel economy benefits as well as reduced cold-start exhaust emissions.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 4:
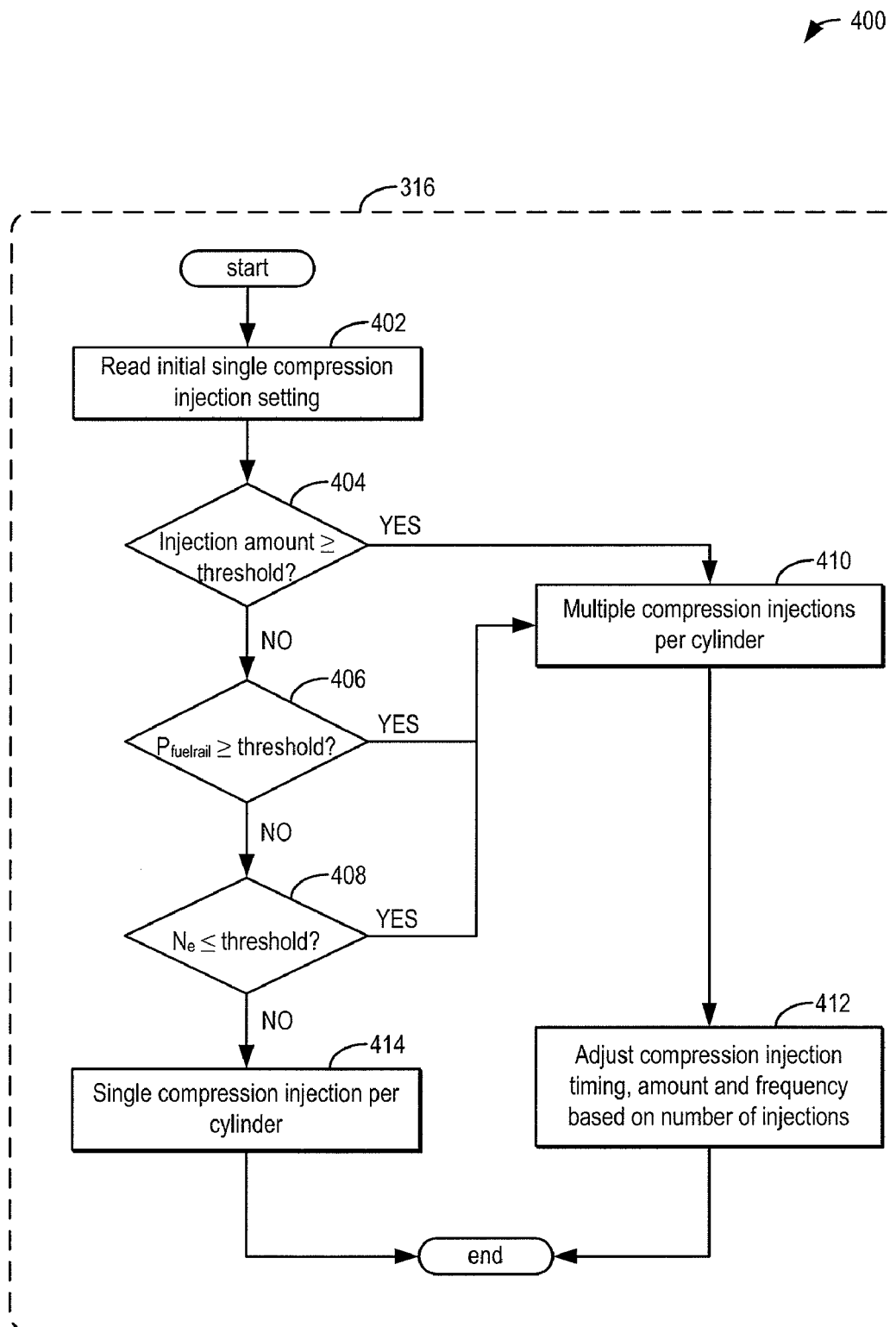
Figure 5:
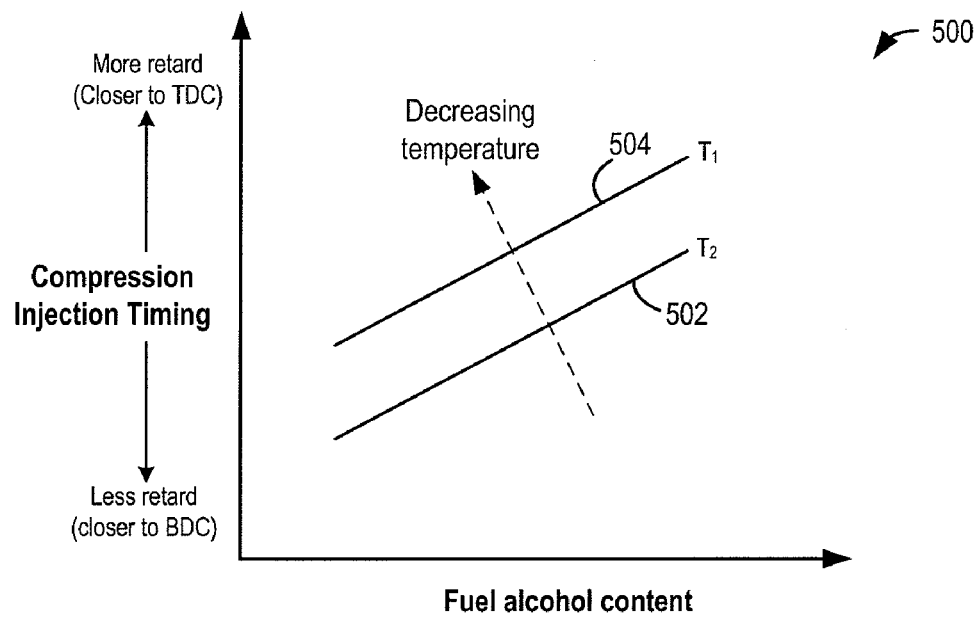
FIG. 5 shows a map depicting variations in injection timing with fuel alcohol content.

The following description relates to systems and methods for improving the startability of alcohol-fuelled engines at cold-start. By performing compression direct fuel injection (as shown in FIG. 2) in an alcohol-fuelled engine (such as the engine of FIG. 1), and further, by retarding the timing of the compression injection as the alcohol content of the injected fuel increases, the evaporation of the alcohol fuel at cold start may be improved. An engine controller may be configured to perform a control routine, such as those depicted in FIGS. 3-4, during an engine cold start, to adjust the fuel injection settings, including an injection timing, of a compression direct fuel injection responsive to the fuel composition, for example, the fuel alcohol content. By retarding the compression injection timing as the fuel alcohol content increases, as depicted in FIGS. 4-5, fuel evaporation and formation of a homogeneous air-fuel mixture at cold start may be improved, without the need for pilot fuel injections. By reducing fuel losses incurred during cold start, the fuel efficiency and quality of vehicle cold start exhaust emissions may be significantly improved.

Figure 1:
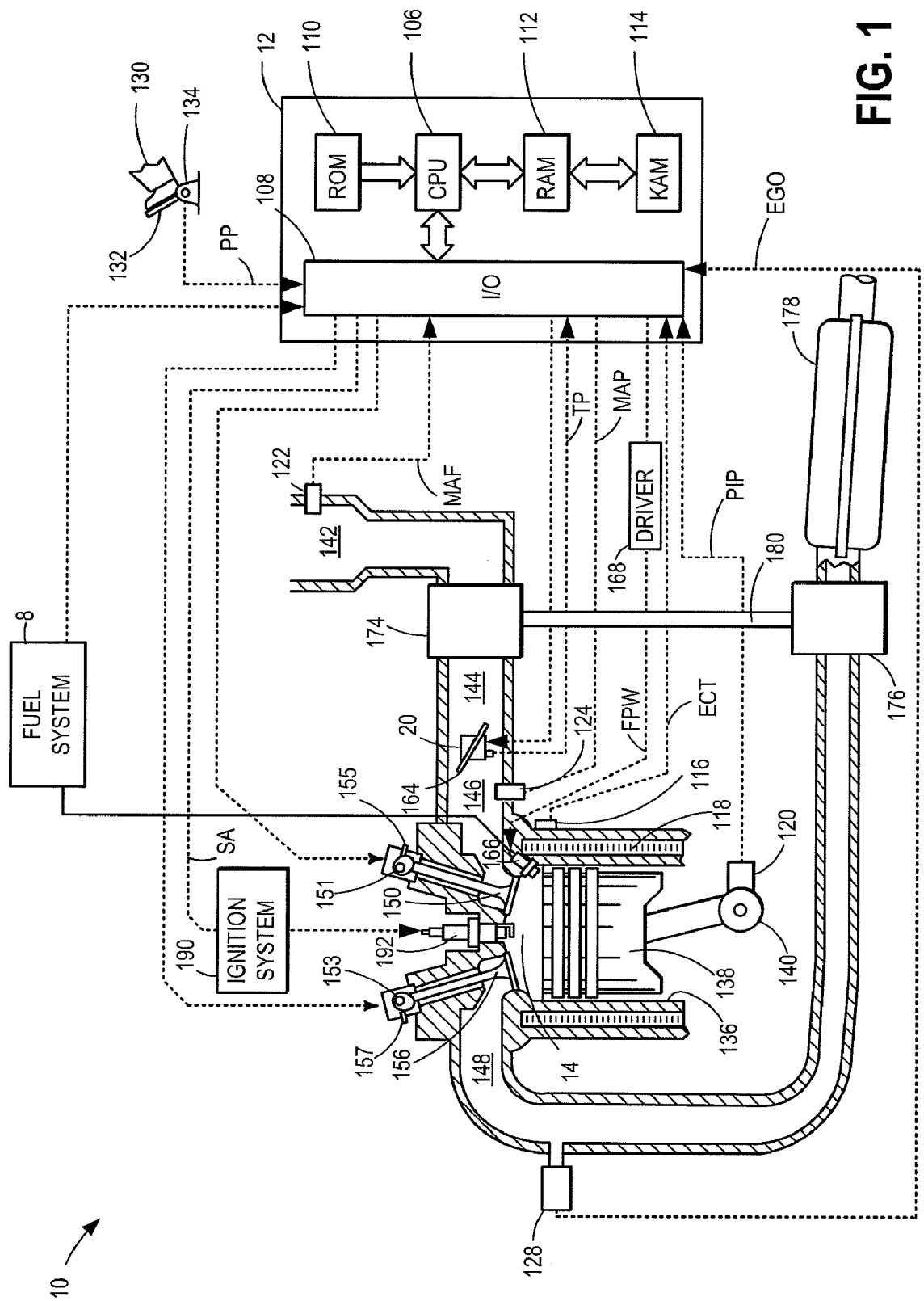
FIG. 1 shows an example embodiment of a combustion chamber operating with a direct fuel injector.
Figure 2:
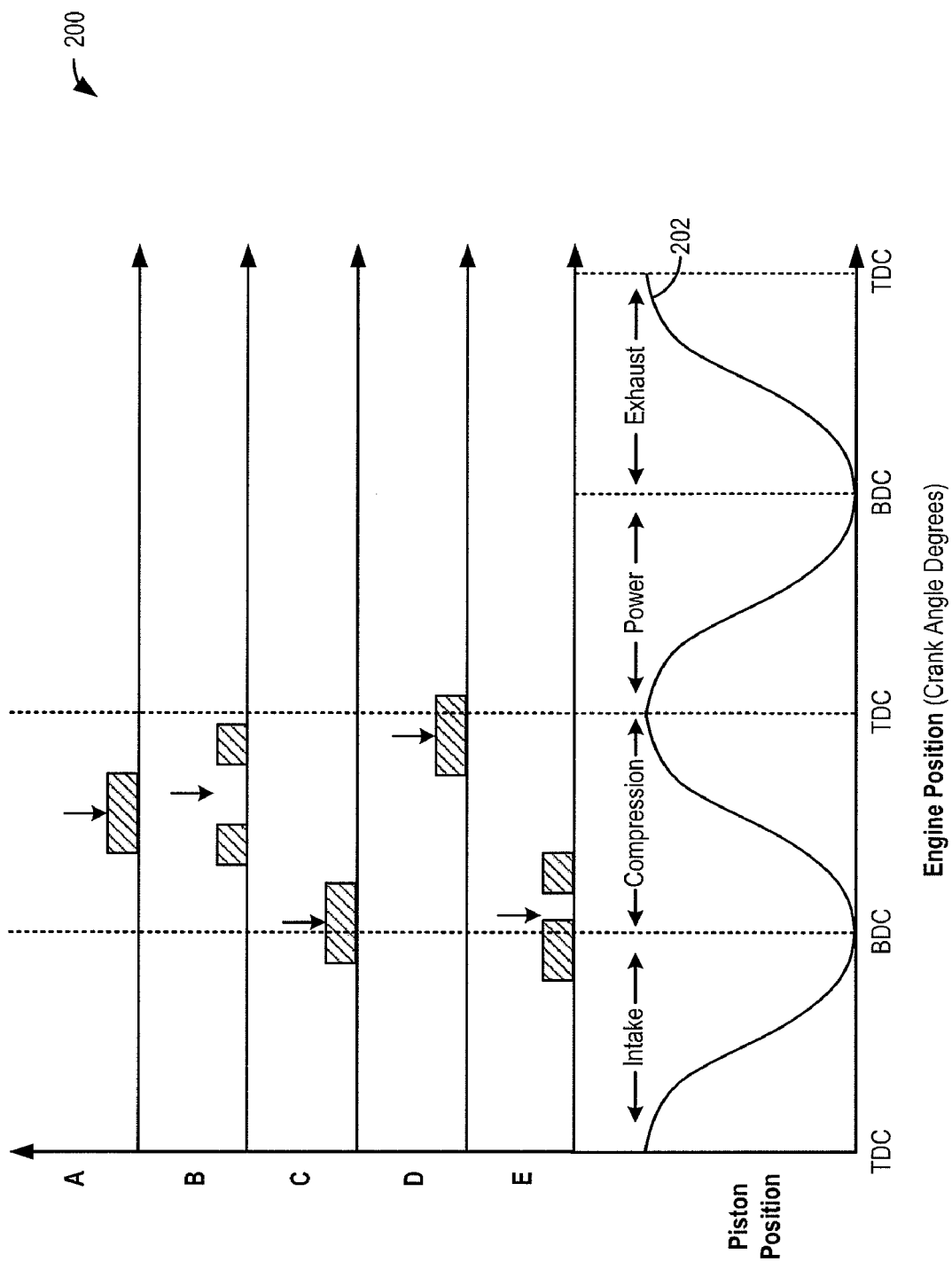
FIG. 2 shows a graph illustrating example compression direct fuel injection operations.

FIG. 1 depicts an example embodiment of a combustion chamber or cylinder of internal combustion engine 10. Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 20 including a throttle plate 164 may be provided along an intake passage of the engine for varying the flow rate and/or pressure of intake air provided to the engine cylinders. For example, throttle 20 may be disposed downstream of compressor 174 as shown in FIG. 1, or alternatively may be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 150 and exhaust valve 156 may be determined by valve position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 14 is shown including one fuel injector 166. Fuel injector 166 is shown coupled directly to cylinder 14 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 14. While FIG. 1 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, injector 166 may be a port injector providing fuel into the intake port upstream of cylinder 14.

It will also be appreciated that while in one embodiment, the engine may be operated by injecting the variable fuel blend via a single direct injector; in alternate embodiments, the engine may be operated by using two injectors (a direct injector and a port injector) and varying a relative amount of injection from each injector.

Fuel may be delivered by the injector to the cylinder during a single cycle of the cylinder. Further, the distribution and/or relative amount of fuel delivered from the injector may vary with operating conditions, such as aircharge temperature, as described herein below. Furthermore, for a single combustion event, multiple injections of the delivered fuel may be performed per cycle. The multiple injections may be performed during the compression stroke, intake stroke, or any appropriate combination thereof.

As described above, FIG. 1 shows only one cylinder of a multi-cylinder engine. As such each cylinder may similarly include its own set of intake/exhaust valves, fuel injector(s), spark plug, etc.

Fuel tanks in fuel system 8 may hold fuel with different fuel qualities, such as different fuel compositions. These differences may include different alcohol content, different octane, different heat of vaporizations, different fuel blends, and/or combinations thereof etc. In one example, fuels with different alcohol contents could include one fuel being gasoline and the other being ethanol or methanol. In another example, the engine may use gasoline as a first substance and an alcohol containing fuel blend such as E85 (which is approximately 85% ethanol and 15% gasoline) or M85 (which is approximately 85% methanol and 15% gasoline) as a second substance. Other alcohol containing fuels could be a mixture of alcohol and water, a mixture of alcohol, water and gasoline etc. In still another example, both fuels may be alcohol blends wherein the first fuel may be a gasoline alcohol blend with a lower ratio of alcohol than a gasoline alcohol blend of a second fuel with a greater ratio of alcohol, such as E10 (which is approximately 10% ethanol) as a first fuel and E85 (which is approximately 85% ethanol) as a second fuel. Additionally, the first and second fuels may also differ in other fuel qualities such as a difference in temperature, viscosity, octane number, latent enthalpy of vaporization etc.

Moreover, fuel characteristics of the fuel tank may vary frequently. In one example, a driver may refill the fuel tank with E85 one day, and E10 the next, and E50 the next. The day to day variations in tank refilling can thus result in frequently varying fuel compositions, thereby affecting the fuel composition delivered by injector 166.

Controller 12 is shown in FIG. 1 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold.

Storage medium read-only memory 110 can be programmed with computer readable data representing instructions executable by processor 106 for performing the methods described below as well as other variants that are anticipated but not specifically listed.

Various examples of compression injection are illustrated in FIG. 2, which includes a graph 200. As such, a compression injection may include injections with injection timing being completely within a compression stroke of the engine (as further elaborated with reference to examples A-B) as well as injections with injection timing being at least partially within the compression stroke of the engine (as further elaborated with reference to examples C-E).

Graph 200 depicts an engine position along the x-axis in crank angle degrees (CAD). Curve 202 depicts piston positions, with reference to their location from top dead center (TDC) and/or bottom dead center (BDC), and further with reference to their location within the four strokes (intake, compression, power and exhaust) of the engine cycle. As indicated by sinusoidal curve 202, a piston gradually moves downward from TDC, bottoming out at BDC by the end of the intake stroke. An intake valve (not shown) may be opened at or before the start of the intake stroke, and may remain open at least until a subsequent compression stroke has commenced. The piston then returns to the top, at TDC, by the end of the compression stroke. As such, during a major portion of the compression stroke, the piston may be moving in the cylinder with the intake and exhaust valves (not shown) of the cylinder closed. The piston then again moves back down, towards BDC, during the power stroke, returning to its original top position at TDC by the end of the exhaust stroke. An exhaust valve may be opened just as the piston bottoms out at the end of the power stroke, for example. The exhaust valve may then close, for example, as the piston completes the exhaust stroke, remaining open at least until a subsequent intake stroke has commenced.

Examples A-E depict variations in compression injection operations. In one example, as illustrated at A, a compression injection may include a single compression injection with the injection timing being completely within the compression stroke. Herein, the injection timing includes an injection start timing, an injection end timing and an injection average timing. In one example, as depicted at A, the injection average timing (as depicted by an arrow) may be at a midpoint of the injection.

In another example, as illustrated at B, the compression injection may include multiple compression injections (herein two injections) with the injection timing of each of the multiple injections being completely within the compression stroke. That is, the injection start timing and the injection end timing of each of the injections lies completely within the compression stroke. Furthermore, the injection average timing may also lie within the compression stroke. In the depicted example, the injection average timing may be a timing at the midpoint of the two injections. While the depicted example shows symmetric multiple injections, in alternate embodiments, the multiple injections may be asymmetric in nature. In one example, a greater fraction of fuel may be injected in a latter injection to take advantage of the hotter aircharge at a later part of the compression stroke. As such, for asymmetric multiple injections, the average timing may not be a midpoint timing, but instead, may be skewed towards the injection with the larger fraction of fuel.

While examples A-B illustrate compression injections where the timing lies completely within the compression stroke, examples C-E illustrate compression injections with the timing being partially within the compression stroke. Herein, the injection timing being partially within the compression stroke includes at least one of the injection start timing, end timing and average timing being within the compression stroke. As illustrated at C, a compression injection may include a single compression injection with the injection start timing being in an intake stroke preceding the compression stroke while the injection end timing lies in the compression stroke, such that the injection average timing lies completely within the compression stroke. In another example, as illustrated at D, a compression injection may include a single compression injection where the injection start timing lies in the compression stroke while the injection end timing lies in the power stroke following the compression stroke, such that the injection average timing lies completely within the compression stroke. In yet another example, as illustrated at E, a compression injection may include multiple compression injections spanning the intake stroke and the compression stroke such that the injection average timing lies completely within the compression stroke. In the depicted example, the multiple injections are asymmetric with a greater fraction of fuel injected in the earlier injection. The earlier injection may have a start timing lying in the intake stroke and an end timing lying in the compression stroke, while the later injection may lie completely within the compression stroke. The injections may be timed such that the average timing lies within the compression stroke. In an alternate example, the multiple injections may be symmetric in nature. While the depicted example illustrates multiple compression injections spanning the intake stroke and the compression stroke, it will be appreciated that in still other examples, the multiple compression injections (symmetric or asymmetric) may span the compression stroke and the power stroke. It should be understood that in all examples, the compression injection may precede an ignition event.

Figure 6:
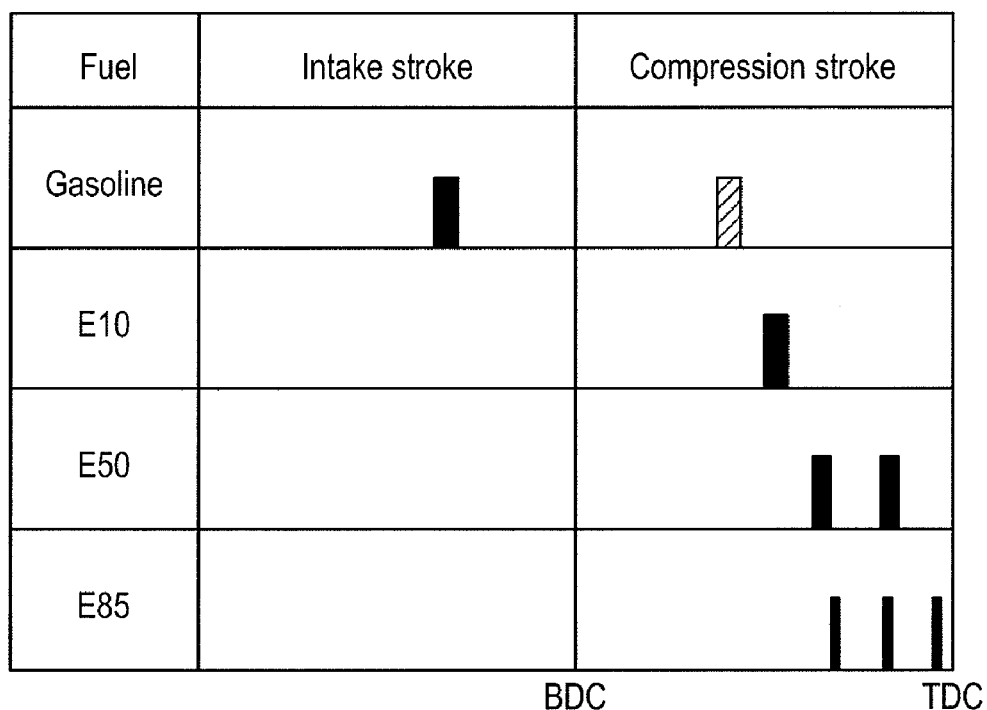
FIG. 6 shows a fuel injection timing chart with example variations in compression injection timings for fuels with differing alcohol content.

As further elaborated with reference to FIG. 6, the injection timing may be retarded as a fuel alcohol content of the injected fuel increases. Herein, retarding the injection timing includes retarding at least one of an injection start timing, injection end timing and injection average timing, the retarded timing moved closer to a compression stroke TDC than BDC.

Figure 3:
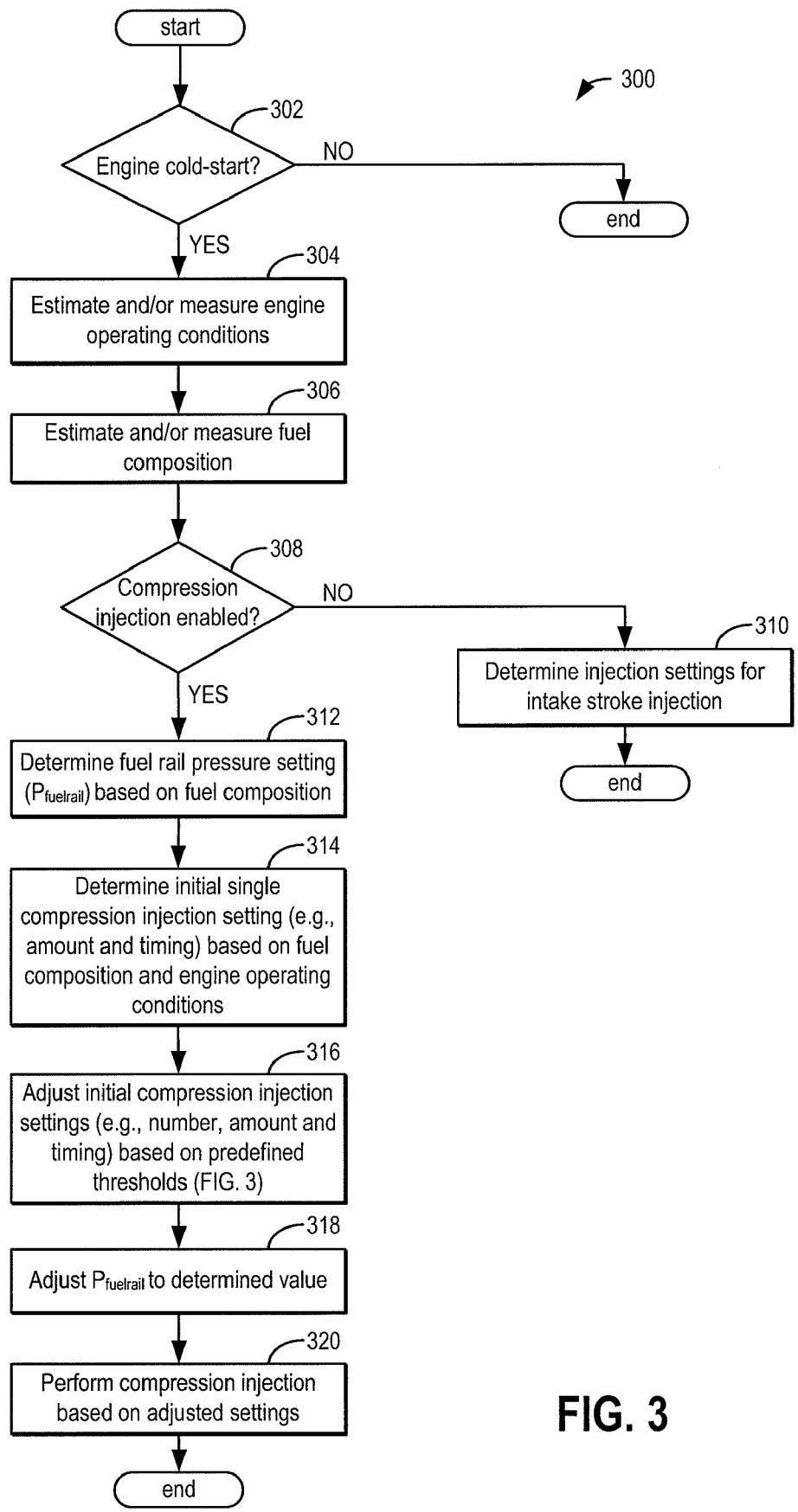
FIGS. 3-4 show high level flow charts illustrating a routine that may be implemented for adjusting settings of a compression fuel injection responsive to fuel composition.

FIG. 3 describes an example control system routine 300 for adjusting a compression fuel injection responsive to fuel composition. By adjusting the timing of the compression injection responsive to the alcohol content of the fuel, the evaporation of the fuel and the mixing of the fuel with air may be improved, thereby improving the quality of a combustion event.

At 302, it may be confirmed whether the engine is in a cold-start condition. If not, the routine may end. Upon confirmation, at 304, the engine operating conditions may be measured and/or estimated. These may include an engine speed, an aircharge temperature, a manifold pressure, barometric pressure, etc. At 306, the fuel alcohol content and/or fuel composition may be determined. In one example, the fuel composition may be determined based on a previous engine operation. In another example, the fuel composition may be determined based on a fuel tank filling event. Alternatively, the fuel composition may be determined based on the output of a fuel composition sensor, such as a fuel alcohol sensor.

At 308, it may be determined whether the engine has been enabled for a compression injection or not, for example, as based on the engine operating conditions estimated at 304. In one example, a compression injection may not be enabled at very low engine temperature conditions (for example, engine temperature being below a threshold temperature). In another example, compression injection may not be enabled until a threshold number of combustion events (for example, 4 combustion events) from engine start have elapsed. In still another example, compression injection may not be enabled until an injection pressure is at a threshold level. For example, in a 6 cylinder engine, compression injection may not enabled for the first and second injections from engine start due to the injection pressure being low (and hence, unable to overcome the increased cylinder pressure). Herein, compression injection may only be enabled after the first two injections have elapsed, that is, for the third, fourth, fifth and sixth injection from the engine start due to the injection pressure having built up by the third injection. In one example, following the sixth injection, compression injection may be disabled since, by then, each cylinder may have had at least one combustion event and thus the residual heat in the cylinder may be enough to vaporize the alcohol fuel sufficiently, even at high alcohol amounts.

If a compression injection is not enabled, then at 310, the routine may proceed to performing a direct injection in the intake stroke and the injection settings for such an intake stroke injection may be determined based on the engine operating conditions. That is, an intake direct fuel injection may be performed.

In contrast, if at 308 it is determined that a compression injection is enabled, then at 312, a desired fuel rail pressure setting ($P_{fuelrail}$) may be determined, at least based on the fuel composition. In one example, the fuel rail pressure may be increased as the fuel alcohol content of the fuel increases, to enhance the atomization of the relatively low volatility fuel during the compression injection. In another example, when the alcohol content of the fuel is lower, a lower fuel rail pressure setting may be selected.

At 314, initial compression injection settings for a single compression injection may be determined based on the fuel alcohol content, and the estimated engine operating conditions. As such, these may include an injection timing, and an injection amount. As previously elaborated, a less retarded compression injection timing may be selected for a fuel of lower alcohol content, while a more retarded compression injection timing may be selected for a fuel of higher alcohol content. In one example, the engine controller may be configured with a look-up table for determining an initial retarded single compression injection timing based on the fuel alcohol content. The compression injection timing may also be adjusted responsive to an engine temperature. For example, at a lower temperature, a more retarded injection timing may be determined. At 316, the initial compression injection settings (such as the number of injections) may be adjusted based on predefined thresholds. As further elaborated with reference to FIG. 4, the thresholds may include fuel rail pressure thresholds, compression injection amount thresholds, engine speed thresholds, etc. In response to the thresholds, the initial settings may be adjusted to vary the number of injections (for example, by shifting to double, triple, or multiple compression injections), and correspondingly adjust the amount injected in each of the multiple injections, and the timing of the multiple injections, as well as a frequency of the injections (that is, a timing between injections). At 318, the fuel rail pressure setting may be adjusted to the value determined at 312. At 320, the compression injection of the fuel may be performed based on the adjusted settings as determined at 316. In one example, performing compression injection may include performing the compression injection for a predetermined number of combustion events (for example, four combustion events) from the beginning of engine rotation. Herein, following the first four combustion events, the cylinder air-charge temperature may be sufficiently high to enable proper vaporization of fuel, including fuel of high alcohol content.

In one example, during a first engine cold-start, for example, on a first day when the fuel tank is filled with a first fuel blend of lower alcohol content, compression direct fuel injection may be performed at a first (less retarded) compression injection timing. Then, during a second engine cold-start, for example, on a second day when the fuel tank is filled with a second fuel that has an increased alcohol amount relative to the first fuel injected during the first engine cold-start, compression direct fuel injection may be performed at a second compression injection timing, the second timing retarded from the first timing. Additionally, the second compression injection may include multiple compression injections, the timing of each injection retarded relative the first injection timing. In another example, during a third engine cold-start, for example on a third day when the tank is filled with gasoline only, when the engine temperature is below a temperature threshold, the injection pressure is below a threshold, and/or before a threshold number of combustion events from engine start have elapsed, an intake direct fuel injection may be performed.

In this way, the relative timing of fuel injections may be adjusted responsive to a fuel alcohol content, to improve the evaporation of the fuel during engine cold-start conditions and thus improve engine startability.

Now turning to FIG. 4, an example routine 400 is described for adjusting an initial setting of the compression injection of FIG. 3. As such, routine 400 may be performed as part of the routine of FIG. 3, specifically at 316.

At 402, the initial compression injection settings, as determined at 314 (FIG. 3), may be read. At 404, it may determined whether the initial single compression injection amount is greater than an injection threshold. In one example, the initial injection amount may be greater than a maximum amount that can be dispensed by the injector in a single injection. In another example, the amount may be greater than a threshold amount within engine combustion stability limits. If the initial setting for the injection amount is above the threshold, then at 410, the number of compression injections may be increased and an engine controller may determine that multiple compression injections are to be performed per cylinder. By increasing the number of injections, the initial injection amount may be injected in multiple installments without adversely affecting the engine's performance.

If the injection amount is not greater than the threshold, then at 406, it may be determined whether the fuel rail pressure setting (as determined at 312, FIG. 3) is above a pressure threshold. As previously elaborated, the fuel rail pressure may be increased as the fuel alcohol content increases to improve the atomization of the injected fuel during the compression stroke. However, if the fuel rail pressure is increased beyond a pressure threshold, the fuel may hit the cylinder walls or the piston surface, potentially leading to fuel loss and/or smoke generation. If the fuel rail pressure is above the pressure threshold, then the routine may proceed to 410 where the controller may determine that multiple compression injections are to be performed per cylinder. By increasing the number of injections as the fuel rail pressure increases beyond the pressure threshold, potential issues related to fuel rail over-pressure conditions may be reduced.

If the fuel rail pressure is not above the threshold, then at 408, it may be determined whether the engine speed ($N_e$) is below a speed threshold. As such, when the engine speed is below the threshold, more time may be available for performing a fuel injection. Thus, when the engine speed is below the speed threshold, the number of compression injections may be increased and multiple compression injections may be enabled. Accordingly, if the engine speed is below the speed threshold at 408, the routine may proceed to 410 and the controller may determine that multiple injections are to be performed per cylinder. In this way, the number of compression injections may be adjusted based at least on the fuel rail pressure, the engine speed and the injection amount.

At 412, the injection amount, timing and frequency (that is, time between the multiple injections) may be adjusted based on the number of multiple injections determined at 410. If the engine speed is not below the threshold at 408, then at 414, the controller may maintain the initial settings for a single compression injection.

In one example, if a double symmetric compression injection is determined at 410 (for example, in response to an increased fuel rail pressure setting), the amount injected per injection may be adjusted to half the value of an initial single compression injection setting. Additionally, the timing of the two injections may be adjusted, for example, retarded, with reference to the initial single compression injection setting. Further still, based on the fuel rail pressure setting determined at 312, the duty cycle and frequency of the fuel injector may be adjusted. Specifically, the time of opening and closing of the fuel injector may be decreased and the timing in between injections may be increased as a fuel rail pressure setting increases. As further illustrated with reference to the example injection settings of FIG. 6, as a fuel alcohol content of the injected fuel increases, for a given engine speed, a controller may be configured to perform multiple injections further retarded in the compression stroke (that is, closer to a compression stroke TDC than BDC), with shorter duty cycles and with greater timing in between the multiple injections.

In this way, by adjusting the compression injection settings, specifically, the number, amount and timing of compression injections, responsive to fuel rail pressure settings, engine speed settings, and combustion stability limits, an improved fuel evaporation may be achieved during engine start for fuels with low volatility.

Referring now to FIG. 5, it depicts an example map 500 of variation in compression injection timing (along the y-axis) responsive to variations in fuel composition (along the x-axis). Specifically, line 502 depicts changes in compression injection timing with fuel alcohol content at engine temperature $T_1$ while line 504 depicts corresponding changes at engine temperature $T_2$. As illustrated, both lines 502 and 504 show a similar trend wherein the compression injection timing is more retarded as the fuel alcohol content increases. As such, the more retarded injection timing may correspond to an injection timing closer to the TDC of the compression stroke where the fuel was injected, while the less retarded injection timing may correspond to an injection timing closer to the BDC of the compression stroke. Comparison of lines 402 and 404 further indicates that when operating with a fuel of a given alcohol content, as the temperature of the cylinder decreases (as shown by the dashed arrow), the compression injection timing may be more retarded. Thus, during an engine cold-start, when the temperature of the cylinder valves and the cylinder aircharge is lower, the compression injection timing may be retarded to enhance the evaporation of the fuel and the efficiency of the combustion event.

FIG. 6 depicts an example fuel injection timing chart 600 with example variations in compression injection settings, including injection timing, for fuels with differing alcohol content. As previously elaborated with reference to FIGS. 3-4, an initial compression injection setting may be determined based on engine operating conditions and fuel compositions, and then further adjusted in view of fuel rail pressure, engine speed and combustion stability considerations.

In one example, when operating the engine with gasoline only, fuel may only be injected in the intake stroke (solid bar). Since gasoline is a high volatility fuel, a lower engine temperature may suffice to evaporate the fuel. Thus, an intake stroke injection may enable efficient air-fuel mixing. However, in an alternate example, part or all of the gasoline fuel may be injected during the compression stroke (hatched bar).

In contrast, when operating the engine with an ethanol fuel blend of lower alcohol content, such as E10, a single compression injection may be performed (solid bar). Since ethanol is a low volatility fuel, a higher engine temperature may be required to evaporate the fuel, particularly at cold-start. Herein, injection timing may be retarded from the intake stroke to the compression stroke to take advantage of the compression stroke's higher cylinder valve temperature and aircharge temperature.

When operating the engine with an ethanol blend of higher alcohol content, such as E50, fuel injection may be further retarded within the compression stroke (that is, retarded closer to TDC of the compression stroke) such that the fuel is injected into hotter aircharge. Additionally, the fuel rail pressure may be increased to improve the atomization of the fuel during the compression stroke. To reduce potential issues associated with the increased fuel rail pressure, such as fuel hitting the cylinder walls and/or the piston surface, multiple compression injections may be performed. In the depicted example, when operating with E50, a double compression injection may be performed, the timing of the two injections delayed from the injection timing of both gasoline and E10. The amount injected per injection may be adjusted to half the value of an initial single compression injection setting to enable a symmetric double compression injection (although an asymmetric injection may alternately be performed). Further still, in response to a higher fuel rail pressure setting (based on the higher alcohol content of E50 versus E10), the duty cycle and frequency of the fuel injector may be adjusted. In the depicted example, in response to the higher fuel rail pressure setting, the time of opening and closing of the fuel injector may be decreased (as depicted by narrower solid bars) and the timing in between the two injections may be increased.

In the same way, when operating the engine with an ethanol blend of still higher alcohol content, such as E85, injection timing may be further retarded into the compression stroke (that is, retarded even closer to TDC of the compression stroke) such that the fuel is injected into hotter aircharge. Herein, in response to the higher fuel alcohol content, the fuel rail pressure may also be further increased to assist in the atomization of the fuel. In the depicted example, when operating with E85, a triple compression injection may be performed, the timing of the three injections delayed from the injection timing of gasoline, E10, and E50. The amount injected per injection may be adjusted to a third of the value of an initial single compression injection setting to enable a symmetric multiple compression injection (although an asymmetric injection may alternately be performed). Further still, in response to the higher fuel rail pressure setting, the duty cycle and frequency of the fuel injector may be adjusted. In the depicted example, in response to the higher fuel rail pressure setting, the time of opening and closing of the fuel injector may be further decreased (as depicted by narrower solid bars) and the timing in between the three injections may be increased. It will be appreciated that in all the depicted examples, the fuel injection may precede an ignition event.

In this way, by adjusting the timing of compression injections responsive to the alcohol content of the fuel, improved evaporation and atomization of the fuel may be enabled, and fuel losses at engine cold-start may be reduced. By enhancing the startability of flex-fuel engines at cold temperature conditions, the need for additional hardware, such as heated injectors, or additional steps, such as pilot fuel injections, may be reduced. Additionally, the quality of cold-start exhaust emissions may be improved. By improving the mixing of air and fuel during combustion events, the efficiency of combustion may be improved, leading to potential fuel economy benefits.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various steps, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated steps or functions may be repeatedly performed depending on the particular strategy being used. Further, the described steps may graphically represent code to be programmed into the computer readable storage medium in the engine control system.

It will be further appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of operating an engine, the engine including an injector configured to directly inject fuel into an engine cylinder, the method comprising,
during an engine cold start, performing compression direct fuel injection; and
retarding a timing of the compression injection as a fuel alcohol content of the fuel increases.

2. The method of claim 1 wherein performing compression direct fuel injection includes performing compression injection for a number of combustion events from a beginning of engine rotation.

3. The method of claim 1 wherein performing compression direct fuel injection includes performing direct fuel injection with injection timing being at least partially within a compression stroke of the engine.

4. The method of claim 3 wherein injection timing being at least partially within a compression stroke of the engine includes at least one of injection start timing, injection end timing, and injection average timing being within the compression stroke.

5. The method of claim 1 wherein performing compression direct fuel injection includes performing compression direct fuel injection with injection timing being completely within a compression stroke of the engine.

6. The method of claim 1 wherein retarding a timing of the compression injection includes retarding at least one of an injection start timing, injection end timing, and an injection average timing, the retarded timing closer to compression stroke TDC than BDC.

7. The method of claim 1 further comprising, increasing an engine fuel rail pressure as the fuel alcohol content of the fuel increases.

8. The method of claim 7 further comprising, adjusting a number of compression injections based on at least one of the fuel rail pressure, an engine speed, and an injection amount.

9. The method of claim 8 wherein adjusting the number of compression injections includes, increasing a number of compression injections if the fuel rail pressure is above a pressure threshold, increasing a number of compression injections if the injection amount is above a threshold, and increasing a number of compression injections if the engine speed is below a speed threshold.

10. A method of operating an engine, the engine including an injector configured to directly inject fuel into an engine cylinder, the method comprising,
during a first engine cold start, performing compression direct fuel injection at a first compression injection timing;
during a second engine cold start, performing compression direct fuel injection at a second compression injection timing retarded from the first compression injection timing, where fuel injected during the second engine cold start has an increased alcohol amount relative to fuel injected during the first engine cold start.

11. The method of claim 10 further comprising, adjusting an engine fuel rail pressure as the alcohol amount of the injected fuel increases.

12. The method of claim 11 wherein performing compression direct fuel injection includes performing multiple compression direct fuel injections, a number of injections adjusted responsive to the adjusted fuel rail pressure, an engine speed, and an injection amount.

13. The method of claim 10 further comprising, adjusting the compression injection timing responsive to an engine temperature.

14. The method of claim 10 wherein performing compression direct fuel injection includes performing compression injection for a number of combustion events from a beginning of engine rotation.

15. The method of claim 10 further comprising, during a third engine cold start, performing intake direct fuel injection, the third engine cold start including a condition of engine temperature being below a threshold, injection pressure being below a threshold, and before a threshold number of combustion events from engine start.

16. The method of claim 10 wherein the second compression injection timing retarded from the first compression injection timing includes the second compression injection timing being closer to compression stroke TDC than BDC.

17. A system for an engine in a vehicle, the system comprising:
a direct injector coupled to a cylinder of the engine; and
a computer readable storage medium having code therein, the medium comprising,
code for, performing a compression direct fuel injection for a number of combustion events from a beginning of engine rotation;
code for retarding a timing of the compression injection as a fuel alcohol content of the fuel increases;
code for increasing a fuel rail pressure as the fuel alcohol content of the fuel increases; and
code for adjusting a number of injections of the compression direct fuel injection based on the fuel rail pressure, an engine speed, and an injection amount.

18. The system of claim 17 wherein retarding the timing includes retarding one of an injection start timing, injection end timing, and an injection average timing, the retarded timing closer to compression stroke TDC than BDC.

19. The system of claim 17 wherein the medium further comprises code for adjusting the retarded timing based on engine temperature.

20. The system of claim 17 wherein adjusting a number of injections includes, increasing a number of compression injections if the fuel rail pressure is above a pressure threshold, if the injection amount is above a threshold, and the engine speed is below a speed threshold.

* * * * *